Patented Nov. 4, 1930

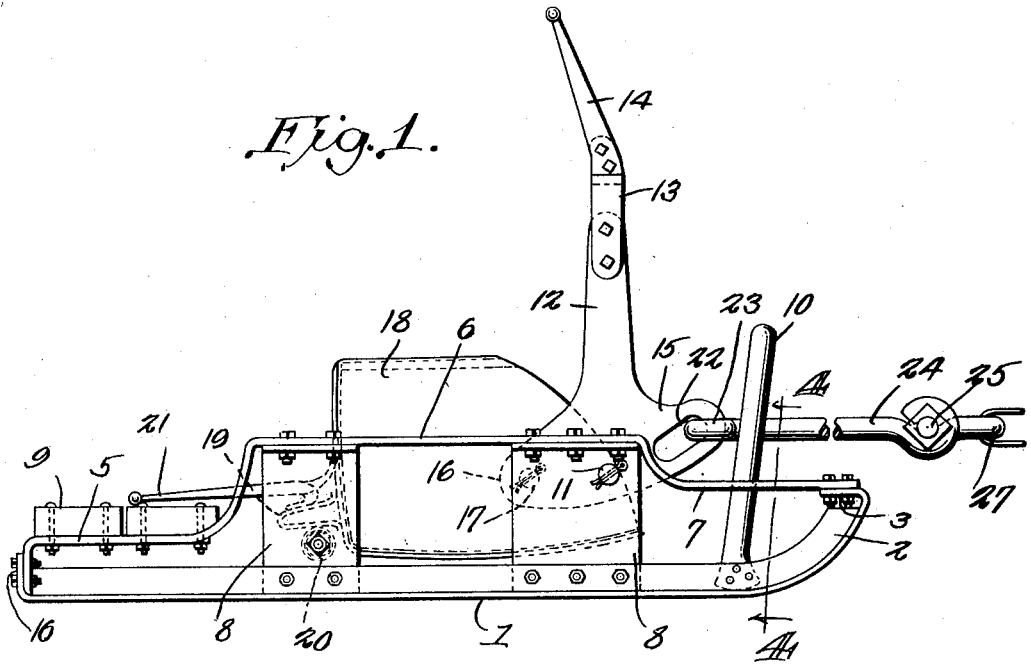

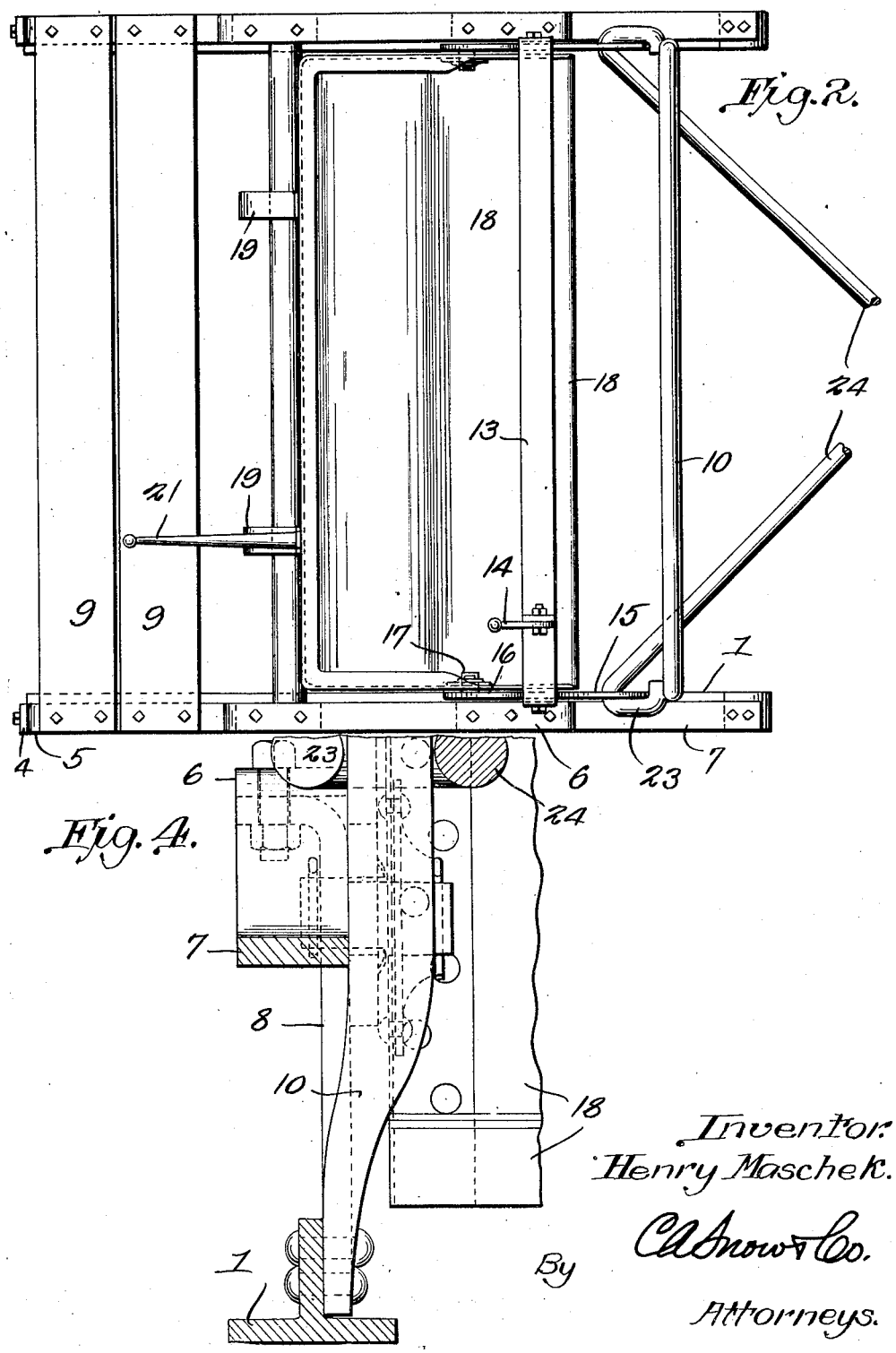

1,780,239

UNITED STATES PATENT OFFICE

HENRY MASCHEK, OF WICHITA FALLS, TEXAS

DIRT MOVER

Application filed August 17, 1929. Serial No. 386,648.

This invention relates to a device for scooping and moving dirt, one of the objects being to provide a structure of this type the scoop portion of which is normally supported above and out of contact with the surface of the soil while it is being drawn thereover, the pull exerted by the draft animal being so applied as to maintain the scoop in its raised position.

Another object is to provide means under the control of the user whereby the scoop can be readily lowered to engage and remove the soil and can also be shifted to dump the load and spread it smoothly over the ground.

A further object is to provide a device of this character which is simple and durable in construction and can be easily manipulated.

With the foregoing and other objects in view which will appear as the description proceeds, the invention resides in the combination and arrangement of parts and in the details of construction hereinafter described and claimed, it being understood that changes in the precise embodiment of the invention may be made within the scope of what is claimed without departing from the spirit of the invention.

In the accompanying drawings the preferred form of the invention has been shown.

In said drawings,

Figure 1 is a side elevation of the dirt mover.

Figure 2 is a plan view, the draft yoke being broken away.

Figure 3 is a front elevation.

Figure 4 is an enlarged section on line 4—4, Figure 1, said section being taken through one side portion of the structure.

Referring to the figures by characters of reference, 1 designates runners each of which is formed of a T-shaped rail the forward end of which is curved upwardly as indicated at 2 and has a backwardly extended tongue 3. An ear 4 is extended upwardly from back end of the runner and secured to this ear is the downturned end of the depressed rear portion 5 of a side strip 6 the forward end portion of which is also depressed as shown at 7 and is attached to the tongue 3. The intermediate portions of the strips 6 are supported by plates 8 riveted or otherwise fastened to the runners and also extending under and bolted to the strips 6 as shown. A small platform made up of crossboards 9 is mounted on the rear depressed portions 5 of the strips 6 and serves to connect the sides of the structure at the back thereof. The front portion of the structure is provided with a transverse yoke 10 the ends of which are attached to the respective runners.

A pivot pin 11 is mounted in each of the forward plates 8 and each pin is extended through the lower portion of an upwardly extending lever 12. The levers are connected at their upper ends by a cross-bar 13 and from this cross-bar is extended an operating arm 14.

Each lever 12 is provided at its lower end with a forwardly extending arm 15 and a rearwardly extending arm 16. Arm 16 has a pivot pin 17 mounted therein and this pin extends through one side of a scoop 18 supported between the side strips 6. The front and top of the scoop are open and the bottom of the scoop is preferably concaved from front to rear, the front edge of the bottom constituting means for digging into the soil when the scoop is set a proper position. From the back of the scoop are extended ears 19 adapted to rest normally on a crossrod 20 connecting the rear side plates 8. The normal position of the scoop with its ears resting on this rod has been illustrated in Figures 1 and 2. An operating arm 21 is extended from the back of the scoop and is adapted to rest on the platform 9 when the scoop is in its normal position.

The front arms 15 of lever 12 are provided with slots 22 normally inclined forwardly and upwardly and slidable in these slots are hooks 23 formed at the rear ends of forwardly converging draft links 24. The front ends of these links can be joined in any suitable manner, as by means of a bolt 25, to a chain 27 or the like whereby the structure may be connected to a draft animal, a small tractor, or other actuating means.

In practice the scoop is located as shown in

Figures 1 and 2 and when a pull is exerted through the links 24 the hooks 23, which are normally located in the forward upper ends of the slots 22, will pull on the arms 15 and maintain the levers 12 in upstanding positions so that the arms 16 and pivot pins 17 will hold the front portion of the scoop 18 raised off of the ground. When it is desired to scoop up a portion of the soil the operator standing on the platform 9 pulls backwardly on the arm 14. This will cause the slotted arms 15 to slide upwardly within the hooks 23 while the arms 16 will swing downwardly, bringing the forward end of the scoop into contact with the soil, it being understood that during this movement the scoop will swing downwardly about the rod 20 as a fulcrum.

As the scoop is advanced the loosened soil will enter it and after the scoop has been filled the arm 14 can be released and further pulling through the links 24 will result in lifting the scoop off of the surface of the ground and supporting the load. When it is desired to dump the contents of the scoop the operator pulls upwardly on the arm 21. Thus the scoop will be swung upwardly at the back thereof about the pivot pins 17 and as the load gravitates from the scoop the lower edge of the bottom thereof will smooth out the delivered material, this smoothing action being constantly controlled by raising or lowering the arm 21 and correspondingly shifting the edge of the scoop.

What is claimed is:

1. The combination with a supporting structure and a scoop therein, of draft means, means actuated by the draft means when subjected to a pulling action, for holding the front of the scoop out of contact with the surface on which the supporting structure is mounted, cooperating means on the scoop and supporting structure for holding the rear portion of the scoop above and out of contact with the surface on which the structure is mounted, and means for swinging the back of the scoop upwardly and forwardly relative to the draft means to dump the contents of the scoop.

2. The combination with a supporting structure, of a scoop therein, a lever structure carried by the supporting structure and connected to the scoop, draft means connected to the lever structure for holding the front portion of the scoop elevated when the draft means is subjected to a pulling action, means whereby the lever structure can be actuated to lower the front portion of the scoop independently of the action of the draft means, cooperating means on the scoop and supporting structure for holding the rear portion of the scoop above and out of contact with the surface on which the supporting structure is mounted, and means extending from the back portion of the scoop whereby said scoop can be swung upwardly and forwardly relative to the lever structure to dump the contents of the scoop.

3. The combination with a supporting structure including runners and a platform on the rear portion of the runners, a scoop, a lever structure connecting the supporting structure to the front portion of the scoop, draft means engaging the lever structure and cooperating therewith to hold the front portion of the scoop out of contact with the surface on which the supporting structure is mounted while the draft means is being subjected to a pulling action, means for actuating the lever structure to lower the front portion of the scoop into contact with the supporting surface independently of the pulling action exerted through the draft means, cooperating means on the supporting structure and scoop and adjacent to the platform for supporting the rear portion of the scoop out of contact with the supporting surface, and means extending from the scoop for actuation by the occupant of the platform to swing the rear portion of the scoop upwardly and forwardly to dump the contents thereof without lifting the lever structure.

In testimony that I claim the foregoing as my own, I have hereto affixed my signature.

HENRY MASCHEK.